United States Patent [19]
Lordan

[11] 3,855,849
[45] Dec. 24, 1974

[54] REENTRY VEHICLE NOSE TIP FLIGHT TESTING APPARATUS

[75] Inventor: Jack M. Lordan, San Pedro, Calif.

[73] Assignee: The United States of America as represented by the Secretary of the United States Air Force, Washington, D.C.

[22] Filed: Apr. 16, 1973

[21] Appl. No.: 351,725

[52] U.S. Cl. .................................................. 73/86
[51] Int. Cl. .......................................... G01n 17/00
[58] Field of Search................... 73/86, 147, 432 SD

[56] References Cited
UNITED STATES PATENTS

| | | | |
|---|---|---|---|
| 3,318,144 | 5/1967 | Duff..................................... | 73/147 |
| 3,357,237 | 12/1967 | Le Bel................................... | 73/86 |
| 3,367,175 | 2/1968 | Morreal et al........................ | 73/86 |

Primary Examiner—Donald O. Woodiel
Assistant Examiner—Stephen A. Kreitman
Attorney, Agent, or Firm—Harry A. Herbert, Jr.; Arsen Tashjian

[57] ABSTRACT

The apparatus provides the simultaneous flight testing of a plurality of reentry vehicle nose tips of the same or of different configuration. A preferred embodiment of the flight testing apparatus includes: a reentry flight test vehicle having a front end (i.e., a nose tip end) and, suitable conventional means for removably mounting the reentry vehicle nose tips which are to be flight tested on, and around, the front end of the reentry test vehicle in a symmetrical pattern. The apparatus significantly reduces the cost, the time, the number of flight tests necessary, and the number of reentry vehicles needed, to evolve a satisfactory design of a reentry vehicle nose tip.

2 Claims, 2 Drawing Figures

PATENTED DEC 24 1974  3,855,849

REENTRY VEHICLE NOSE TIP FLIGHT TESTING APPARATUS

BACKGROUND OF THE INVENTION

This invention relates to testing apparatus and, more particularly, to a unique apparatus for simultaneously flight testing a plurality of reentry vehicle nose tips.

The design, the testing, and the development of nose tips for reentry vehicles has proven to be very costly, because of the need for many flight tests (i.e., launches) in the evolution of a satisfactory design of each nose tip or of a representative prototype nose tip of a particular proposed nose tip type.

Experience and analysis clearly establish that what is needed in the art, but is not available, is a technique for alleviating this very serious cost problem.

I have invented a unique testing apparatus which significantly reduces the cost of test flights of the nose tips to be tested. The reduction in cost is achieved primarily by using my apparatus to reduce the number of flight tests needed for satisfactorily testing each individual nose tip. In addition, my apparatus significantly reduces the time and the number of reentry test vehicles needed to flight test a plurality of nose tips. Further, my apparatus allows the use of common equipment to be used, for example, for the measurement of tip ablation of each individual nose tip being flight tested, for the transmission and/or receipt of telemetry signals, for the recovery of flight tested nose tips and vehicle body motion common to all the tips under test.

SUMMARY OF THE INVENTION

This invention pertains to a reentry vehicle nose tip testing apparatus.

The principal object of this invention is to provide a new and useful apparatus providing the simultaneous flight testing of a plurality of reentry vehicle nose tips.

Another object of this invention is to allow the use of common equipment to measure ablation of individual nose tips being flight tested, to transmit and/or to receive telemetry signals, to recover the nose tips which have been flight tested, and the like.

These objects, and other equally important and related objects, of this invention will become readily apparent after a consideration of the description of the invention, coupled with reference to the drawings.

DESCRIPTION OF THE PREFERRED EMBODIMENT

Figure 1:
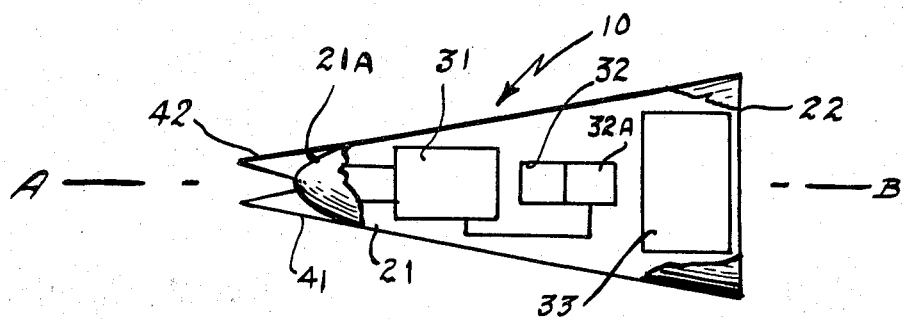
FIG. 1 is a side elevation view, in schematic form and partially fragmented, of a preferred embodiment of the invention; and, FIG. 2 is a front end view, also in schematic form but not to scale, of the preferred embodiment shown in FIG. 1.

With reference to FIG. 1, therein is shown, in a side elevation view, in schematic form, and partially fragmented, a test vehicle body 10 of my invention having a front or forward end 21, and also having a back or aft end 22. At the most forward portion of front end 21 is the nose tip portion 21A of the reentry flight test vehicle 10. The longitudinal axis of vehicle 10 is designated by broken line A-B.

Suitably positioned within the test vehicle 10 is common equipment which, by way of illustration and not by way of limitation, includes multiple sensor 31 measuring the respective ablation of each of the individual reentry vehicle nose tips being flight tested; sensor 32 measuring the motion of vehicle body 10, such motion being common to all nose tips on the vehicle; appropriate telemetry equipment 32A for remote transmission of the outputs of sensors 31 and 32; and a recovery system 33, for recovering the reentry test vehicle 10 and the nose tips flight tested therewith.

Also shown in FIG. 1 are two representative reentry vehicle nose tips 41 and 42 to be flight tested simultaneously, by the use of my invention. The representative nose tips 41 and 42 are fixedly mounted on the front end 21 of reentry test vehicle 10, as are likewise mounted the other nose tips of the plurality to be flight tested.

Figure 2:
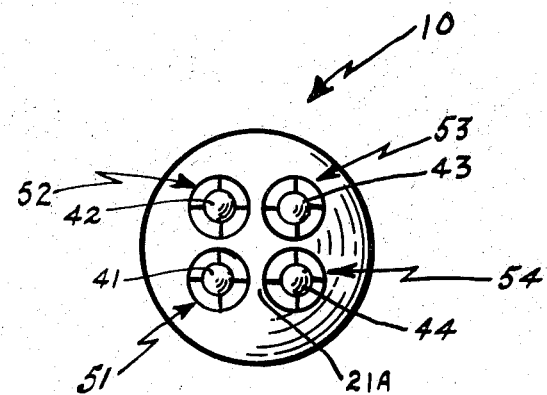

Shown in FIG. 2 are: the reentry test vehicle 10 of my invention having a fore end 21 which, in turn, has a nose tip portion 21A and means 51-54, inclusive, for fixedly mounting the plurality of reentry vehicle nose tips 41-44, inclusive, to be flight tested simultaneously.

MODE OF OPERATION OF THE PREFERRED EMBODIMENT

The mode of operation of the preferred embodiment of my invention is understood from the foregoing description, couple with reference to FIGS. 1 and 2.

Succinctly, and in essence, the reentry test vehicle nose tips 41-44 which are to be flight tested simultaneously, are removably mounted on the front end 21 (and/or the nose tip portion 21A) of the reentry flight test vehicle 10. As a matter of preference, and as shown in FIGS. 1 and 2, the nose tips to be flight tested are mounted symmetrically on, and around, the front end 21 or the nose tip portion 21A thereof. Each nose tip may be provided with conventional ablation gages (not shown), to sense the changes in nose tip shape as a result of ablation and erosion in atmospheric flight. The output of each meter is fed to a common sensor 31. Such outputs are processed by sensor 31 into data such as ablation rate and then relayed through the telemetry equipment 32A to a ground station. Alternatively, equipment 32A could be a recorder for storage of data which is retrieved after vehicle recovery.

The reentry flight test vehicle is launched into flight, the nose tips are flight tested, and, the reentry test vehicle, with the nose tips mounted thereon, is recovered.

A significant result, therefore, is that a plurality of reentry vehicle nose tips are effectively, efficiently, and inexpensively flight tested with the use of one reentry test vehicle, rather than a plurality requiring multiple launch vehicles and launches.

CONCLUSION

It is clear from the foregoing description and from the drawings herein, that the objects of my inventive apparatus are attained, and that my invention eliminates the disadvantages of the prior art.

In addition, while there have been shown and described the fundamental unique features of my invention, as applied to a particular preferred embodiment, it is to be understood that various other embodiments, substitutions, additions, omissions, adaptations, and the like, can be made by those of ordinary skill in the art, without departing from the spirit of the invention. For example, transpiration cooled reentry vehicle nose tips can be simultaneously tested by the use of an adaption of my invention, with a common tank supplying coolant at the same or at different rates to the individual nose tips of the plurality of nose tips which are simultaneously being flight tested. Additionally, it is emphasized that the plurality of nose tips being tested with and by the use of my invention, may be of different design. Further, it is appropriate here to point out that the number of nose tips which can be simultaneously flight tested would depend on the size of the front end of the reentry test vehicle, and the desired or required separation distance between the nose tips to be tested.

What I claim is:

1. An apparatus for simultaneously flight testing a plurality of reentry vehicle nose tips, comprising:
   a. a reentry flight test vehicle having a front end;
   b. means for fixedly mounting a plurality of reentry vehicle nose tips, which are to be flight tested, on the front end of said test vehicle; and
   c. means, in each said nose tip, for measuring changes in the tips during reentry.
2. Apparatus as defined in claim 1 and further including
   a sensor means receiving outputs from all the measuring means for processing each output from each measuring means.

* * * * *